United States Patent [19]

Rochefort et al.

[11] 4,263,168

[45] Apr. 21, 1981

[54] OLEFINE POLYMERIZATION CATALYST

[75] Inventors: Malcolm P. Rochefort, Luton; Paul D. Gavens, Welwyn Garden City, both of England

[73] Assignee: Imperial Chemical Industries Limited, London, England

[21] Appl. No.: 24,366

[22] Filed: Mar. 27, 1979

[30] Foreign Application Priority Data

Jan. 10, 1979 [GB] United Kingdom ............... 00943/79

[51] Int. Cl.$^3$ .......................................... C08F 4/64
[52] U.S. Cl. .............................. 252/429 B; 526/124; 526/129; 526/139; 526/140; 526/141; 526/142; 526/143
[58] Field of Search ..................................... 252/429 B

[56] References Cited

U.S. PATENT DOCUMENTS

| | | |
|---|---|---|
| 3,121,064 | 2/1964 | Patat et al. ................... 252/429 B |
| 3,202,645 | 8/1965 | Yancey ........................ 252/429 B X |
| 3,222,296 | 12/1965 | Aftandilian ................... 252/429 B |
| 3,499,882 | 3/1970 | Nudenberg et al. ......... 252/429 B X |
| 3,549,717 | 12/1970 | Itakura et al. ................ 252/429 B X |
| 3,878,124 | 4/1975 | Durand et al. ................ 252/429 B |
| 3,888,789 | 6/1975 | Dombro et al. .............. 252/429 B |
| 4,115,319 | 9/1978 | Scata et al. .................. 252/429 B |

FOREIGN PATENT DOCUMENTS

| | | |
|---|---|---|
| 2008619 | 1/1970 | France . |
| 2390456 | 8/1978 | France . |
| 1235062 | 6/1971 | United Kingdom . |
| 1286867 | 8/1972 | United Kingdom . |
| 1306044 | 2/1973 | United Kingdom . |
| 1352718 | 5/1974 | United Kingdom . |
| 1484254 | 9/1977 | United Kingdom . |
| 2015009 | 9/1979 | United Kingdom . |

*Primary Examiner*—Patrick Garvin
*Attorney, Agent, or Firm*—Cushman, Darby & Cushman

[57] ABSTRACT

A component of a polymerization catalyst is prepared by reacting an organo-magnesium halide with a solid, inorganic oxide, then reacting the product with a Lewis Base compound, particularly an ester and finally with titanium tetrachloride. After reacting the organo-magnesium halide with the inorganic oxide it may be treated with a halogenating agent before it is reacted with the Lewis Base compound. The product obtained is combined with an organo-aluminium compound preferably together with a Lewis Base and used to polymerize an olefine monomer. The catalyst has a high activity, is stereospecific and has a lower proportion of halogen than some other catalyst systems.

15 Claims, 1 Drawing Figure

A $\quad MgR_{(2-x)}X_x$

B $\quad R^1COOR^2$

C $\quad R^3_a SiX_{(4-a)}$

D $\quad R^4COX$

E $\quad R^5X_b$

F $\quad MgR_2$

G $\quad MgR_2 cAlR_3$

H $\quad CH_2=CHR^6.$

OLEFINE POLYMERIZATION CATALYST

The present invention relates to a process for the production of a component of an olefine polymerisation catalyst, polymerisation catalysts including the component thus obtained and an olefine polymerisation process using such catalysts.

Olefine monomers, such as ethylene, propylene and the higher alpha-olefines, can be polymerised using the so-called Ziegler-Natta catalysts. The term "Ziegler-Natta catalyst" is generally used to mean a catalyst system obtained from a compound of a transition metal of Groups IVA to VIA of the Periodic Table together with an organometallic compound of a non-transition metal of Groups IA to IIIA of the Periodic Table. Using such catalysts, propylene and the higher alpha-olefines are polymerised to form a mixture of isotactic and atactic polymer, the isotactic polymer being the commercially desirable material. The polymer formed also contains catalyst residues and hitherto these have been present in such proportions that it has been necessary to treat the polymer to reduce the level of such residues.

There have been many proposals to improve the activity and/or stereospecificity of the catalyst system. Such proposals include the use of additional catalyst components, typically Lewis Base compounds, or the modification of one or other or both of the components of the catalyst system. There have been proposals to support the catalyst system on an inorganic oxide but usually such supported catalysts have been of low stereospecificity.

According to the present invention there is provided a process for the production of a composition suitable for use as a component of an olefine polymerisation catalyst, which process comprises treating a component I which is at least one inorganic oxide with a component II which is a magnesium hydrocarbyl halide compound, a component III which is a Lewis Base compound and a component IV which is titanium tetrachloride, wherein (A) component I is reacted with component II;
(B) the product of stage (A) is reacted with either component III or component IV; and
(C) the product of stage (B) is reacted with whichever of component III or component IV is not used in stage (B).

The process of the present invention reacts four materials together in a specified sequence. It is preferred that in stage (B), the product of stage (A) is reacted with component III.

Thus, according to a preferred aspect of the present invention, in stage (A), component I is reacted with component II, in stage (B), the product from stage (A) is reacted with component III, and in stage (C), the product of stage (B) is reacted with component IV.

Suitable materials for use as the at least one inorganic oxide which is component I include those with a substantially inert matrix material having a hydroxylic surface (as hereinafter defined) which is free from adsorbed water. By "hydroxylic surface" is meant a surface having a plurality of —OH groups attached to the surface, the hydrogen atom of the —OH group being capable of acting as a proton source, that is, having an acidic function. A matrix material having such a surface is substantially inert in that the bulk of the matrix material is chemically inert.

The at least one inorganic oxide may be silica, alumina, magnesia, mixtures of two or more thereof, for example magnesium trisilicate which may be represented as $(MgO)_2(SiO_2)_3 nH_2O$ (n is a positive number), or materials based thereon and containing minor amounts, for example less than 10% by weight, of other suitable inorganic oxides such as zinc oxide. A particularly useful inorganic oxide is silica.

The at least one inorganic oxide preferably has a surface area of at least 30 $m^2/g$, particularly at least 100 $m^2/g$ and especially at least 200 $m^2/g$. Useful forms of the at least one inorganic oxide may be obtained by heating an inorganic oxide or hydroxide in an inert atmosphere, and/or at a reduced pressure, to a temperature of at least 200° C. and not more than 1200° C. and preferably in the range 300° to 1000° C. A suitable inert atmosphere for the heating is nitrogen and a suitable reduced pressure is less than 10 mm of mercury. The temperature used will be dependent on the material being heated. Thus, if silica is being heated, it is especially preferred to use a temperature in the range 320° up to 400° C., for example 350° C. Using hydrated alumina, for example Boehmite which may be regarded as hydrated gammaalumina, or aluminium hydroxide, it is especially preferred to use a temperature in the range 400° up to 1000° C., for example 500° C.

Stage (A), the reaction of component I with component II, is conveniently carried out by adding a liquid medium which contains the magnesium hydrocarbyl halide compound to the at least one inorganic oxide, which may be suspended in an inert liquid medium such as an aliphatic hydrocarbon. The liquid medium is conveniently a solution of the magnesium hydrocarbyl halide compound in an inert liquid such as a hydrocarbon liquid, for example hexane, heptane, octane, decane, dodecane or mixtures of the isomers thereof, or an inert halohydrocarbon such as chlorobenzene.

The formulae A-H in the drawing represent the compounds used in this invention.

The magnesium hydrocarbyl halide compound is a compound of formula (A) in the attached formula drawings.

In the formula (A),

R is a hydrocarbyl group, typically an alkyl group, conveniently an alkyl group containing from 1 up to 20 carbon atoms, especially 1 up to 6 carbon atoms;

X is a halogen atom, other than fluorine, preferably a chlorine atom; and x is a number from 0.5 up to 1.5, for example from 0.8 up to 1.2.

Whilst the magnesium hydrocarbyl halide compound may be used as the simple compound without any associated complexing agent, compounds of this type are commonly available as complexes with organic Lewis Bases, particularly ethers such as diethyl ether or di-n-butyl ether. The amount of the organic Lewis Base which is complexed with the magnesium hydrocarbyl halide compound is dependent primarily on the nature of the organic Lewis Base and typically does not exceed 3 moles of the organic Lewis Base for each mole of the magnesium hydrocarbyl halide compound. Preferred complexes are those containing 0.1 up to 2.0, and especially 0.5 up to 1.0, moles of the organic Lewis Base for each mole of the magnesium hydrocarbyl halide compound.

For convenience herein, the term "magnesium hydrocarbyl halide" is used to include both the uncomplexed material and also complexes with an organic Lewis Base, unless otherwise indicated.

The quantity of the magnesium hydrocarbyl halide which is added to the at least one inorganic oxide is dependent on the nature of the inorganic oxide, the surface area thereof and, in particular, any heat treatment used in obtaining the inorganic oxide. The quantity of the magnesium hydrocarbyl halide which is added is desirably in excess of that required to saturate the surface of the inorganic oxide and is conveniently in excess of one mole for each mole of reactive sites on the inorganic oxide. The reactive sites are typically surface hydroxyl groups and the proportion thereof can be readily determined by adding an excess quantity of the magnesium hydrocarbyl halide and measuring the quantity of unreacted magnesium hydrocarbyl halide which remains at the end of the addition time. The magnesium hydrocarbyl halide can be added to the inorganic oxide at any suitable temperature, for example from 0° C. up to 100° C., conveniently at ambient temperature, that is from about 15° C. up to about 25° C. After adding the magnesium hydrocarbyl halide to the inorganic oxide, the materials are conveniently allowed to remain in contact for at least 5 minutes and not more than 20 hours, for example 0.25 up to 6 hours. After the desired period of contacting, the solid material is separated from the liquid medium and then may be washed one or more times and finally subjected to an optional low pressure (about 1 mm of mercury) treatment at any suitable temperature, for example from 0° C. up to 100° C., conveniently at ambient temperature, for a time of up to several hours, for example 2 hours, before being used in the next stage of the preparation.

In stage (B), the supported product of stage (A) is preferably treated with component III and this is conveniently effected by adding the Lewis Base compound to a suspension, in an inert hydrocarbon liquid of the product of stage (A). The quantity of Lewis Base used is conveniently in an amount of up to 1 mole of Lewis Base compound for each mole of the magnesium hydrocarbyl halide which has reacted with the inorganic oxide, hereafter referred to as the "reacted magnesium compound". Preferred quantities of the Lewis Base compound are from 0.1 up to 0.8 mole for each mole of the reacted magnesium compound and especially at least 0.5 up to 0.8 mole for each mole of the reacted magnesium compound.

Conveniently, the treating of the supported product with the Lewis Base compound may be effected at temperatures of from 0° C. up to 100° C. and is very conveniently carried out at ambient temperature, that is from about 15° C. up to about 30° C. The treating is effected for any convenient time, which may be for 0.1 up to 70 hours, especially 1 up to 20 hours.

The Lewis Base compound can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, a thioether, a thioester, a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an alkanolamine, an amine, a cyclic amine such as pyridine or quinoline, a diamine such as tetramethylethylenediamine or an organo-phosphorus compound such as an organo-phosphine, an organo-phosphine oxide, an organo-phosphite or an organo-phosphate. The use of organo-Lewis Base compounds is disclosed, inter alia, in British Patent Specifications Nos. 803 198, 809 717, 880 998, 896 509, 920 118, 921 954, 933 236, 940 125, 966 025, 969 074, 971 248, 1 013 363, 1 017 977, 1 049 723, 1 122 010, 1 150 845, 1 208 815, 1 234 657, 1 324 173, 1 359 328, 1 383 207, 1 423 658, 1 423 659 and 1 423 660.

Preferred Lewis Base compounds are esters which may be represented by the formula (B) given in the attached formula drawings.

In the formula (B), $R^1$ is a hydrocarbyl group which may be substituted with one or more halogen atoms and/or hydrocarbyloxy groups; and $R^2$ is a hydrocarbyl group which may be substituted by one or more halogen atoms.

The groups $R^1$ and $R^2$ may be the same or different. The group $R^1$ is conveniently an alkyl or aryl group, for example a methyl, ethyl, phenyl or tolyl group. The group $R^2$ is preferably an alkyl group containing up to 6 carbon atoms, for example an ethyl or a butyl group. It is particularly preferred that $R^1$ is an aryl group and $R^2$ is an alkyl group.

After treating with the Lewis Base compound the product thus formed is conveniently separated from the reaction medium and washed with an inert liquid.

Stage (C) is preferably the reaction with component IV (titanium tetrachloride). In this preferred stage (C), titanium tetrachloride is added to the product of treating with the Lewis Base compound. The addition may be effected by adding a solution of titanium tetrachloride to the solid or a suspension of the solid, but is conveniently carried out by suspending the reaction product in undiluted titanium tetrachloride. The amount of titanium tetrachloride is preferably in a molar excess relative to the reacted magnesium compound. The addition is conveniently carried out at a temperature from 0° C. up to the boiling temperature of titanium tetrachloride, which is about 137° C. at atmospheric pressure. Preferably the addition is carried out at a temperature of from 60° C. up to 120° C. especially 75° C. to 100° C. After adding the titanium tetrachloride to the solid, the materials are conveniently allowed to remain in contact for from 0.25 up to 10 hours, preferably 1 up to 5 hours.

After the desired time of contacting, the product obtained is separated from the unreacted titanium tetrachloride and washed several times with an inert liquid medium.

In a variation of the foregoing procedure, before or after stage (A), the at least one inorganic oxide or the supported product from stage (A) is treated with at least one halogenating agent before it is treated with component III or component IV. Thus, it should be appreciated that all references to the treatment of the product of stage (A) with either component III or component IV include the treatment of such a product which additionally has been treated with the at least one halogenating agent. The halogenating agent is preferably a chlorinating agent. Suitable halogenating agents include hydrogen halides such as hydrogen chloride, silicon halides of the formula (C) in the attached formula drawings, carboxylic acid halides of the formula (D) in the attached formula drawings, hydrocarbyl halides of the formula (E) in the attached formula drawings, phosphorus pentachloride, thionyl chloride, sulphuryl chloride, phosgene, nitrosyl chloride, halides of mineral acids, chlorine, bromine, chlorinated polysiloxanes, hydrocarbyl aluminium halides, aluminium chloride and ammonium hexafluorosilicate, wherein $R^3$ is hydrogen or a hydrocarbyl group, preferably an alkyl group containing 1 up to 6 carbon atoms or an aryl, alkaryl or aralkyl group containing 6 up 15 carbon atoms;

$R^4$ is a hydrocarbyl group, preferably an alkyl group containing 1 up to 4 carbon atoms or an aryl, alkaryl or aralkyl group containing 6 up to 12 carbon atoms;

$R^5$ is a hydrocarbyl residue;

X is as hereinbefore defined;

a is 0 or an integer from 1 up to 3; and b is an integer from 1 up to 10.

The silicon halides of formula (C) include silicon tetrachloride, silicon tetrabromide and halosilanes such as trimethyl silicon monochloride, diethyl silicon dichloride and monobutyl silicon trichloride.

The carboxylic acid halides of formula (D) include acetyl chloride, benzoyl chloride and p-methylbenzoyl chloride.

The hydrocarbyl halides of formula (E) include carbon tetrachloride, chloroform, ethyl chloride, ethylene dichloride and 1,1,1-trichloroethane.

Halides of mineral acids include boron trichloride and antimony pentachloride.

Hydrocarbyl aluminium halides include diethyl aluminium chloride and monoethyl aluminium dichloride.

The quantity of the at least one halogenating agent is preferably sufficient to provide at least one halogen atom at every reactive site on the inorganic oxide. The treatment with the at least one halogenating agent can be effected at ambient temperature or at an elevated temperature of up to 100° C. The preferred temperature is dependent on the particular halogenating agent, for example using silicon tetrachloride, the temperature is preferably at least 60° C. The treatment is conveniently carried out by adding the at least one halogenating agent to a stirred suspension of the product obtained by adding the magnesium hydrocarbyl halide to the inorganic oxide. Using a gaseous halogenating agent such as hydrogen chloride, the gas can be passed into the reaction medium until no further absorption is observed to occur. The treatment with the at least one halogenating agent is conveniently effected for a time of from 0.25 up to 10 hours, preferably 1 up to 5 hours.

After the treatment with the at least one halogenating agent, the reaction product is conveniently separated from the reaction medium and washed several times. The product of the treatment with the at least one halogenating agent is then conveniently reacted with the Lewis Base compound in the manner previously described.

In a yet further variation of the foregoing procedure, the product of stage (A) is reacted simultaneously with both the Lewis Base compound which is component III and the at least one halogenating agent. It should be appreciated that such a simultaneous reaction does not necessarily require that both component III and the at least one halogenating agent are added to the product of stage (A) at the same time provided that the second of the two reagents to be added is added before the first of the two reagents has been separated from the reaction mixture.

The product may be separated and washed between each stage of the reaction but it should be appreciated that it is not necessary to do this at all stages of the process.

The product obtained contains a titanium compound and a magnesium compound supported on an inorganic oxide. This product may be used as one component of an olefine polymerisation catalyst.

More specifically, as a further aspect of the present invention, there is provided an olefine polymerisation catalyst which comprises (1) the reaction product obtained by the process of the present invention; and (2) an organic compound of a metal of Group IIA of the Periodic Table or of aluminium or a complex of an organo-metallic compound of a metal of Group IA or Group IIA of the Periodic Table with an organic compound of aluminium.

Component (2) of the catalyst can be a Grignard reagent, preferably one which is substantially ether-free, or can be a compound of formula (F) or (G) in the attached formula drawings, in which R is as hereinbefore defined; and c has a value up to 2, typically 0.05 up to 1.0.

If the component (2) is a complex of a metal of Group IA with an organo-aluminium compound, this compound may be of the type lithium aluminium tetraalkyl. It is preferred that the component (2) is an organo-aluminium compound which may be, for example, an aluminium hydrocarbyl halide such as a dihydrocarbyl aluminium halide, an aluminium hydrocarbyl sulphate, or an aluminium hydrocarbyl hydrocarbyloxy but is preferably an aluminium trihydrocarbyl or a dihydrocarbyl aluminium hydride. The aluminium trihydrocarbyl is preferably an aluminium trialkyl in which the alkyl group contains from 1 up to 4 carbon atoms and is particularly an ethyl group.

Using an aluminium trihydrocarbyl as component (2) it is preferred that the catalyst system also includes a Lewis Base compound. The Lewis Base compound can be any Lewis Base compound of the type disclosed for the production of component (1) of the catalyst system and preferred Lewis Base compounds are esters of formula (B). Esters of anisic acid (4-methoxybenzoic acid) are particularly preferred as the Lewis Base component of the catalyst system.

In addition to, or instead of, the Lewis Base compounds, the catalyst system may also include a substituted or unsubstituted polyene, which may be an acyclic polyene such as 3-methylheptatriene(1,4,6), or a cyclic polyene such as cyclooctatriene, cyclooctatetraene, or cycloheptatriene or the alkyl- or alkoxy-substituted derivatives of such cyclic polyenes, tropylium salts or complexes, tropolone or tropone.

The proportions of components (1) and (2) of the catalyst system can be varied within a wide range as is well known to the skilled worker. The particular preferred proportions will be dependent on the type of materials used and the absolute concentrations of the components but in general we prefer that for each gramme atom of titanium which is present in component (1) of the catalyst system there is present at least one mole of component (2) and preferably at least 5 moles of component (2) for each gramme atom of titanium. The number of moles of component (2) for each gramme atom of titanium in component (1) may be as high as 1000 and conveniently does not exceed 500.

When the catalyst system includes a Lewis Base component in addition to component (2), it is preferred that the Lewis Base compound is present in an amount of not more than 1 mole for each mole of component (2) and particularly from 0.1 up to 0.5 mole of the Lewis Base compound for each mole of the component (2). However, depending on the particular organo-metallic compound and Lewis Base compound, the proportion of the Lewis Base compound may need to be varied to achieve the optimum catalyst system.

If the catalyst system includes a polyene, it is preferred that the polyene is present in an amount of not more than one mole for each mole of component (2), and especially from 0.01 up to 0.20 mole for each mole of component (2). If the catalyst system includes both a Lewis Base component and a polyene, it is preferred that both of these materials are together present in an amount of not more than one mole for each mole of component (2).

Catalysts in accordance with the present invention can be used to polymerise or copolymerise olefine monomers.

Thus, as a further aspect of the present invention there is provided an olefine polymerisation process which comprises contacting, under polymerisation conditions, at least one olefine monomer with a catalyst in accordance with the present invention.

The olefine monomer which may be contacted with the catalyst system is one having the formula (H) as set out in the accompanying formula drawings.

In the formula (H), $R^6$ is a hydrogen atom or an alkyl radical.

Thus, the olefine may be ethylene, propylene, butene-1, pentene-1, hexene-1, 4-methylpentene-1 or any other olefine which satisfies formula H). The olefine monomer is preferably one containing not more than 10 carbon atoms. The olefine monomers may be homopolymerised or may be copolymerised together. If propylene is copolymerised it is preferred to effect the copolymerisation with ethylene, conveniently using a sequential copolymerisation process as is described in British Patent Nos. 970,478; 970,479 and 1,014,944. If ethylene is being copolymerised using the process of the present invention, it is preferred to carry out the copolymerisation using a mixture of ethylene and the desired comonomer, for example butene-1 or hexane-1, wherein the mixture of monomers has essentially the same composition throughout the polymerisation process.

It has been found that the process of the present invention can be used for the polymerisation of propylene to give a relatively low proportion of the undesirable soluble polymer and also a high yield of polymer relative to the amount of titanium which is present in component (1) of the catalyst system.

It is preferred to mix component (1) of the catalyst with the other component or components in the presence of the monomer. If the catalyst includes a Lewis Base compound, it is preferred to premix the organo-metallic compound which is component (2) with the Lewis Base compound. This pre-mixture and the reaction product which is component (1) are then mixed together.

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Patent Specification Nos. 1,111,493; 1,226,659 and 1,383,611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase is preferably effected using conditions which are such that the monomer is at a temperature and partial pressure which are close to the dew point temperature and pressure for that monomer. Such a procedure is described in more detail in published German Patent Application No. 2 616 356. Polymerisation in gas phase can be effected using any technique suitable for effecting a gas-solid reaction such as a fluidised-bed reactor system, a stirred-bed reactor system or a ribbon blender type of reactor.

Polymerisation may be effected either in a batch manner or on a continuous bases, and the catalyst components may be introduced into the polymerisation vessel separately or all the catalyst components may be mixed together before being introduced into the polymerisation reactor. It will be appreciated that any pre-mixing of all the catalysts components is preferably effected in the presence of a monomer and such premixing will result in polymerisation of this monomer before the catalyst system is introduced into the polymerisation vessel.

The polymerisation can be effected in the presence of a chain transfer agent such as hydrogen or a zinc dialkyl, in order to control the molecular weight of the product formed. It hydrogen is used as the chain transfer agent, it is conveniently used in an amount of from 0.01 up to 5.0%, particularly from 0.05 up to 2.0% molar relative to the monomer. The amount of chain transfer agent will be dependent on the polymerisation conditions, especially the temperature, which, at polymerisation pressures not exceeding 50 kg/cm², is typically in the range from 20° C. up to 100° C., preferably from 50° C. up to 85° C.

Polymerisation can be effected at any pressure which has been previously proposed for effecting the polymerisation of olefine monomers. However, although the polymerisation may be effected at pressures up to 3000 Kg/cm², at which pressures the polymerisation temperature may be as high as 260° C., it is preferred to carry out the polymerisation at relatively low pressures. Whilst the polymerisation may be effected at atmospheric pressure, it is preferred to use a slightly elevated pressure and thus it is preferred that the polymerisation is effected at a pressure of from 1 Kg/cm² up to 50 Kg/cm², preferably from 5 up to 30 Kg/cm².

Using catalysts in accordance with the present invention ethylene or propylene may be polymerised to give polymers having desirable properties. Thus, propylene may be polymerised to give a polymer having a high flexural modulus. Ethylene copolymers with alpha-olefine comonomers such as butene-1 or hexene-1, may also be obtained using the catalysts in accordance with the present invention and these polymers have a desirable combination of characteristics. It will be appreciated that the particle form of the polymer obtained is dependent upon, and hence is affected by, the particle form of the inorganic oxide, which is used as component I in the production of the transition metal composition which is component (1) of the catalyst system. Hence, by the selection of an inorganic oxide having an appropriate particle form, such as essentially spherical particles, a polymer of a desired form may be obtained.

Various aspects of the present invention will now be described with reference to the following Examples which are illustrative of the invention. In the Examples, all operations are effected under an atmosphere of nitrogen unless otherwise indicated. All the glass apparatus was dried in an air oven at 120° C. for at least one hour and purged with nitrogen before use.

(A) Treatment of alumina

A sample of hydrated gamma-alumina (Ketjen Grade B obtainable from Akzo Chemie of Amsterdam, Holland) was heated up to 500° C. under nitrogen at atmospheric pressure, maintained at 500° C. for two hours and then allowed to cool, in the oven, to ambient temperature.

(B) Treatment of alumina

A sample of hydrated gamma-alumina (Ketjen Grade B) was heated up to 1000° C. under nitrogen at atmospheric pressure, maintained at 1000° C. for ten hours and then allowed to cool, in the oven, to ambient temperature.

(C) Treatment of silica

A sample of silica having a high specific surface area ('Ultrasil' grade VN3 obtainable from I D Chemicals Ltd, of Runcorn, England) was heated up to 350° C. under nitrogen at atmospheric pressure, maintained at 350° C. for two hours and then allowed to cool, in the oven, to ambient temperature.

(D) Treatment of magnesium trisilicate

A sample of hydrated magnesium trisilicate [$(MgO)_2 \cdot (SiO_2)_3 \times H_2O$ obtained from British Drug Houses Limited of Poole, England] was heated up to 375° C. under nitrogen at atmospheric pressure, maintained at 375° C. for three hours and then allowed to cool, in the oven, to ambient temperature.

(E) Preparation of magnesium butyl chloride-butyl ether complex

The preparation was carried out in a one liter, three-necked flask fitted with a tap adaptor, a stirring rod (plus air-tight seal) and a two-necked adaptor holding a gas-balanced dropping funnel and water cooled condenser. Into this flask were placed magnesium turnings (13.2 g, 0.54 mol) and pure, dry, air-free heptane (375 cm$^3$) in which was dissolved n-butyl chloride (3 cm$^3$, 28 mmol). Into the dropping funnel was placed a solution of n-butyl chloride (52.3 cm$^3$, 0.5 mol) dissolved in di-n-butyl ether (83.3 cm$^3$, 0.5 mol). The mixture in the flask was stirred and gently heated to reflux the mixture while a little of the n-butyl chloride solution, plus a few crystals of iodine, were added. The stirring was stopped occasionally and the mixture studied to watch for fading of the deep violet iodine colouration and the formation of bubbles. After 5 to 10 minutes the start of the reaction was signalled by the disappearance of the iodine colouration. Stirring was then resumed and sufficient heat applied to keep the mixture refluxing, while the n-butyl chloride solution was added dropwise over a period of one hour. The reaction mixture was then stirred for a further four hours.

The solution of the magnesium n-butyl chloride-n-butyl ether complex was left to settle, and kept under nitrogen. Aliquots of the supernatant were titrated against standard acid to indicate the concentration of magnesium n-butyl chloride complex in solution.

(F) Purification of solvents

All the solvents used were essentially pure and dry. Before use, the solvents were purged with nitrogen and evacuated to a low pressure, the purging and evacuation being repeated four times.

(G) Treatment of silica

A sample of silica (Davidson 952 grade from W R Grace and Company of Maryland, USA) was heated up to 350° C. under nitrogen at atmosphereic pressure, maintained at 350° C. for two hours and then allowed to cool, in the oven, to ambient temperature.

EXAMPLES 1 TO 9

(I) Treatment of support with magnesium n-butyl chloride complex solution

The reaction vessel was a three-necked glass flask having a capacity of 300 cm$^3$, provided with a sintered glass disc at the bottom of the flask and having a stirrer.

A suspension of 10 g of the support material (treated as described under (A), (B), (C) or (D) in 100 cm$^3$ of n-heptane was placed in the flask and the suspension was stirred at ambient temperature. A sample of the solution obtained in (E) was added, in the amount set out in Table 1, to the stirred slurry and the mixture was stirred, without heating, for a period of time as indicated in Table 1. The supernatant liquid was then filtered off and the solid was washed twice using 100 cm$^3$ of n-heptane for each wash. The supernatant liquid plus the washings were titrated with standard acid, from which the amount of the magnesium hydrocarbyl halide which had reacted with the solid material was deduced.

(II) Treatment with ethyl benzoate

The solid obtained in I was subjected to vacuum (0.5 mm of mercury) at ambient temperature for two hours. 100 cm$^3$ of n-heptane were added to the solid and the mixture was stirred. Undiluted ethyl benzoate was then added to the stirred suspension in an amount sufficient to provide 0.7 mole of ethyl benzoate for each mole of the magnesium hydrocarbyl halide which was deduced to have reacted with the solid material in I. The suspension was stirred at ambient temperature for 16 hours. The solid was optionally washed, as indicated in Table 1. When washing was effected, the solid was washed once using 100 cm$^3$ of n-heptane.

(III) Treatment with titanium tetrachloride

To the damp solid from II were added 100 cm$^3$ of neat, undiluted titanium tetrachloride. The mixture was stirred and heated up to 80° C., which temperature was maintained for two hours. The mixture was then filtered, whilst still hot and the solid was then washed as indicated in Table 2. In most Examples, the product was subjected to analysis and the results are set out in Table 2.

For comparative purposes, products were obtained in which step II, the treatment with ethyl benzoate, was omitted.

Further details of steps I and II are given in Table 1, and of step III in Table 2.

TABLE 1

| Ex or Comp Ex | Support Type (a) | Organo-Mg Treatment | | | EtBz treatment (d) | |
|---|---|---|---|---|---|---|
| | | Amount Added (cm³) (b) | Stir time (hr) | Loading (mM/g) (c) | Amount Added (mM/g) (e) | Washing |
| 1,2 | C | 75 | 0.5 | 2.3 | 1.6 | YES |
| A,B | C | 75 | 0.5 | 2.3 | NIL | NO |
| 3,4,5 | A | 130 | 0.25 | 5.4 | 3.8 | NO |
| 6,7 | B | 85 | 0.25 | 1.6 | 1.1 | YES |
| 8 | D | 55 | 0.33 | 0.64 | 0.45 | YES |
| 9 | A* | 150 | 0.33 | 2.5 | 1.7 | YES |

Notes to Table 1
(a) A to D indicate the materials treated in accordance with A) to D).
*This was pretreated with ethyl benzoate before step I by suspending 10 g of A in 143 cm³ of a 1% v/v solution of ethyl benzoate (10 millimoles) in n-heptane, the mixture was stirred for 16 hours at ambient temperature, filtered, washed twice with 50 cm³ n-heptane and evacuated to 0.5 mm of mercury and maintained at that pressure for 3 hours.
(b) Amount, in cm³, of the solution obtained in E which was added.
(c) Loading is given as millimoles (mM) of the magnesium compound for each gramme of (support plus magnesium compound).
(d) EtBz is ethyl benzoate.
(e) Amount added is given as millimoles (mM) of ethyl benzoate for each gramme of the solid product obtained in I.
NIL - there was no treatment with ethyl benzoate.

TABLE 2

| Ex or Comp Ex | Washing (f) | Analysis (h) | | |
|---|---|---|---|---|
| | | Ti | Mg | Cl |
| 1 | H | 0.89 | 2.2 | 6.5 |
| 2 | H,To | 0.63 | 1.8 | 4.7 |
| A | H | 1.6 | 1.7 | 6.4 |
| B | H,To | 1.1 | 1.3 | 4.2 |
| 3 | H, | ND | ND | ND |
| 4 | H,Ti | 0.67 | 2.9 | 7.6 |
| 5 | H,Ti,To | 0.62 | ND | ND |
| 6 | H | 0.56 | 1.4 | 3.9 |
| 7 | H,To | 0.51 | ND | ND |
| 8 | H | 0.56 | ND | ND |
| 9 | H | 0.75 | ND | ND |

Note to Table 2
(f) H - the solid was washed 4 times using 100 cm³ of n-heptane at 80° C. for each wash. H,To - the solid was washed 4 times using 100 cm³ of n-heptane at 80° C. for each wash and was then washed 6 times using 100 cm³ of toluene at ambient temperature for each wash. H,Ti - the solid was washed 4 times using 100 cm³ of n-heptane at 80° C. for each wash, and was then washed once using 80 cm³ of titanium tetrachloride at 80° C. followed by 4 times using 50 cm³ of n-heptane at 80° C. for each wash. H,Ti,To - the procedure was as described for H,Ti with the exception that, after the second set of washings with n-heptane, the solid was finally washed 6 times using 100 cm³ of toluene at ambient temperature for each wash.
(g) Milligramme atom for each gramme of total solid product. ND means Not Determined.

EXAMPLES 10 TO 33

The products of Examples 1 to 9 and Comparative Examples A and B were then used to polymerise propylene.

The propylene used for the polymerisation had been purified by passing gaseous propylene in turn through a column (7.6 cm diameter, 90 cm length) containing 1.5 mm granules of 'Alcoa' F1 alumina at 50°–60° C., and then through a similar column containing BTS catalyst (cupric oxide reduced to finely divided metallic copper on a magnesium oxide support) at 40°–50° C., condensing the issue gas and passing the liquid propylene through four columns (all 7.6 cm diameter; two of 90 cm in length, two of 1.8 m in length) at 25° C., each containing 1.58 mm pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc) was unchanged at 0.3% and the level of unsaturated hydrocarbons (allene, methylacetylene, etc) was unchanged at <1 ppm.

The polymerisations were effected in a three-necked glass flask having a capacity of two liters and an outer jacket for circulating a cooling (or heating) medium.

The polymerisation flask was thoroughly dried under vacuum (0.2 mm of mercury) and the outer jacket filled with water circulating at the desired temperature for the run from a thermostatically controlled bath. The vessel was then filled with nitrogen and 500 cm³ of n-heptane were added. The n-heptane was purged with nitrogen and then evacuated, the purging and evacuation being repeated three times. The propylene feedline was connected, evacuated once and then was purged with propylene. The diluent was then subjected to vacuum and propylene gas admitted to saturate the diluent at one atmosphere pressure. A solution of triethyl aluminium (1.0 M solution in n-heptane was added to the diluent at this stage. In some examples (as in Table 3), a solution containing a freshly prepared mixture of triethyl aluminium and ethyl anisate was used.

A suspension of one of the products of Examples 1 to 9 or Comparative Examples A and B was added to the n-heptane diluent using a syringe, via a rubber septum in an amount sufficient to provide titanium in the quantity specified in Table 3. Propylene was added at a rate sufficient to maintain the pressure at atmospheric pressure and the quantity of propylene added was monitored. The vessel was generally wrapped around with aluminium foil as protection from direct light. Polymerisation was terminated after up to 4 hours (see Table 3) by turning off the flow of propylene, and vacuum purging the vessel with nitrogen several times. Isopropanol was then added (~10 cm³) carefully to deactivate the catalyst mixture. The polymer suspension was then filtered and the residues washed with petroleum ether (60°–80° bp). The combined filtrate was analysed to determine the proportion of soluble polymer formed.

Further details of the polymerisation conditions, the polymer yield and proportion of soluble polymer are set out in Table 3.

TABLE 3

| Ex or Comp Ex (i) | Ti Comp Type (j) | Ti Comp Amount Added (mM) (k) | Polyn Temp (°C.) | Amount TEA Added (mM) (l) | EA/TEA (m) | Polymerisation Time (hrs) | Polymerisation Act (n) | % Sol Polymer (o) |
|---|---|---|---|---|---|---|---|---|
| 10 | 1 | 1.15 | 60 | 16.9 | NIL | 1.0 | 41 | 25++ |

TABLE 3-continued

| Ex or Comp Ex (i) | Ti Comp Type (j) | Ti Comp Amount Added (mM) (k) | Polyn Temp (°C.) | Amount TEA Added (mM) (l) | $\frac{EA}{TEA}$ (m) | Polymerisation Time (hrs) | Polymerisation Act (n) | % Sol Polymer (o) |
|---|---|---|---|---|---|---|---|---|
| 11 | 1 | 1.8 | 60 | 18.0 | 9.4:3 | 1.7 | 38 | 3.4++ |
| 12 | 1 | 1.8 | 60 | 18.0 | 8:3 | 2.0 | 36 | 2.1++ |
| 13 | 1 | 1.8 | 60 | 18.0 | 7.5:3 | 2.0 | 19 | 1.5++ |
| 14 | 1 | 1.8 | 60 | 18.0 | 2:1 | 2.0 | 9.3 | 8.1++ |
| 15° | 1 | 1.8 | 60 | 18.0 | 7.8:3 | 2.0 | 22 | 4.0+++ |
| 16 | 2 | 0.65 | 60 | 8.8 | NIL | 2.2 | 57 | 22+++ |
| 17 | 2 | 0.65 | 60 | 8.8 | 8.3 | 2.2 | 33 | 0.7+++ |
| 18 | 2 | 0.75 | 80 | 8.8 | 8:3 | 3.0 | 16 | 2.3+++ |
| 19°° | 2 | 0.55 | 80 | 8.8 | 8:3 | 3.0 | 15 | 1.9+++ |
| C | A | 3.65 | 60 | 18.0 | NIL | 2.0 | 8.9 | 26++ |
| D | A | 3.05 | 60 | 18.0 | 8:3 | 2.0 | 3.8 | 21++ |
| E | B | 1.2 | 60 | 18.0 | NIL | 2.0 | 14 | 29+++ |
| F | B | 2.2 | 60 | 18.0 | 8:3 | 2.0 | 3.8 | 17+++ |
| G | B | 1.1 | 60 | 9.0 | NIL | 1.3 | 25 | 40+++ |
| 20 | 3 | 0.9 | 60 | 8.8 | NIL | 1.9 | 19 | 28+++ |
| 21 | 3 | 0.9 | 60 | 8.8 | 8:3 | 2.0 | 2.7 | 5.6+++ |
| 22 | 4 | 0.75 | 60 | 8.8 | NIL | 3.5 | 14 | 12+++ |
| 23°° | 4 | 0.75 | 80 | 8.8 | NIL | 3.5 | 9.1 | 23+++ |
| 24 | 5 | 1.05 | 60 | 8.8 | NIL | 4.2 | 19 | 24+++ |
| 25 | 5 | 1.05 | 60 | 8.8 | 8:3 | 4.0 | 0.7 | 11+++ |
| 26 | 6 | 0.65 | 60 | 8.8 | NIL | 3.0 | 22 | 45+++ |
| 27 | 6 | 0.65 | 60 | 8.8 | 8:3 | 3.0 | 4.3 | 2.6+++ |
| 28 | 7 | 0.7 | 60 | 8.8 | NIL | 1.8 | 37 | 23+++ |
| 29 | 7 | 0.7 | 60 | 8.8 | 8.8:3 | 1.8 | 3.5 | 5.9+++ |
| 30 | 8 | 1.0 | 60 | 8.8 | NIL | 1.3 | 30 | 20+++ |
| 31 | 8 | 1.0 | 60 | 8.8 | 8:3 | 1.3 | 1.2 | 2.1+++ |
| 32 | 9 | 0.65 | 60 | 12.9 | NIL | 3.3 | 11 | 42+++ |
| 33 | 9 | 0.65 | 60 | 12.9 | 8:3 | 1.1 | 3.1 | 14+++ |

Notes to Table 3

(i) ° in this polymerisation, a mixture of propylene and hydrogen was used which contained 0.1% by weight of hydrogen.
°°in this polymerisation, the polymerisation diluent was an aliphatic hydrocarbon mixture consisting essentially of pentamethylheptane isomers and having a boiling temperature of about 180° C.
(j) The Ti comp (titanium component) is the product of Examples 1 to 9 or Comparative Examples A or B.
(k) Amount added is given as millimoles (mM) of titanium contained in the Ti comp.
(l) TEA is triethyl aluminium. Amount added is given as millimoles (mM) of TEA.
(m) Molar ratio of ethyl anisate to TEA. NIL indicates catalyst system does not include ethyl anisate.
(n) "Act" is the average activity during the first hour of polymerisation and is expressed as grammes of total polymer for each millimole of titanium contained in the titanium component, for each atmosphere of pressure and each hour of polymerisation.

(o) "% Sol Polymer" is given by the relationship:-

$$\frac{\text{(Weight of polymer dissolved in diluent)} \times 100}{\text{(Weight of polymer + Weight of insoluble polymer) dissolved in diluent}}$$

++This was determined by one of two techniques:- The combined filtrate (at the end of polymerisation) was evaporated at up 80° C. and a reduced pressure (15 mm of mercury) to give a total soluble content (including some oxidised organo-aluminium compounds).
+++The total volume of the combined filtrate was measured and an aliquote taken (100 cm³), dilute ammonia solution added (few drops) to precipitate the organo-aluminium compound (as $Al_2O_3$ n $H_2O$). This mixture was left at 60° C. for at least two hours, then two samples of the supernatant were taken and evaporated down separately, the residues being weighed and averaged. A figure for the total soluble polymer was then obtained by taking the weight of these sample residues and multiplying by the total volume of solvent divided by the volume taken for the sample. The total weight of insoluble polymer was either estimated from the total weight of insoluble material minus the estimated weight of insoluble catalyst residues, or the polymer was ashed and an accurate determination of catalyst residues obtained.

EXAMPLE 34

(I) Treatment of support with magnesium n-butyl chloride complex solution

The reaction vessel described for Examples 1 to 9 was used. 11.46 g of the silica (treated as described in G)), were stirred with 50 cm³ of n-heptane and 100 cm³ of a 0.623 M solution in n-heptane of a n-butyl magnesium chloride complex (prepared as described in E)), at ambient temperature for 16 hours. The mixture was filtered and washed four times using 100 cm³ of n-heptane at ambient temperature for each wash.

(II) Treatment with ethyl benzoate 100 cm³ of n-heptane and 2.3 cm³ of ethyl benzoate (0.7 mole per gramme atom of magnesium) were added to the solid from I) and the mixture was stirred for 16 hours at ambient temperature. The mixture was then filtered and washed four times using 100 cm³ of n-heptane at ambient temperature for each wash.

(III) Treatment with titanium tetrachloride 100 cm³ of titanium tetrachloride were added to the solid from II and the mixture was stirred at 80° C. for 4 hours. The mixture was then filtered without cooling and washed four times using 100 cm³ of n-heptane at 80°

C. for each each wash. The solid was suspended in 100 cm³ of n-heptane.

EXAMPLE 35

The procedure of Example 34 was repeated with the following variations.

In step (I), 11.86 g of silica were used.

After step (I), and before step (II), 50 cm³ of n-heptane and 50 cm³ of silicon tetrachloride were added to the solid from (I), the mixture was stirred, heated to 80° C. and maintained at 80° C. for 3 hours. The mixture was then cooled to ambient temperature, filtered, and washed four times at ambient temperature using 100 cm³ of n-heptane for each wash.

In step (II), 2.4 cm³ ethyl benzoate were used.

EXAMPLES 36 TO 41

The products of Examples 34 and 35 were used as components of polymerisation catalysts to polymerise propylene.

The propylene used for the polymerisation had been purified as described for Examples 10 to 33.

A two-liter, glass polymerisation flask having three necks and equipped with an efficient stirrer and a water jacket was dried carefully and 1 liter of a pentamethylheptane fraction having a boiling range of about 170°–180° C. was introduced. The liquid was vigorously stirred, evacuated at 60° C., purged with nitrogen and evacuated, which treatment effectively reduced the water and oxygen contents of the diluent to below 10 ppm by weight. The diluent was then saturated with the purified propylene to one atmosphere pressure. Triethyl aluminium was introduced, as a solution in the pentamethylheptane fraction in the amount shown in Table 4. A solution, in the pentamethylheptane fraction of ethylanisate, was then added in the amount shown in Table 4. The product of Example 34 or Example 35 was then introduced in the amount shown in Table 4. The pressure in the reaction vessel was maintained at one atmosphere by supply of propylene from a burette. After a period of 2.0 hours from the introduction of the titanium-containing material, the run was terminated with 10 cm³ of isopropanol and 5 cm³ of propylene oxide and a sample of supernatant liquid extracted for determining the concentration of soluble polymer dissolved in the polymerisation diluent. The solid was filtered and washed three times with petrol ether and dried in a vacuum oven (0.1 mm of mercury pressure) at 120° C. for an hour.

The results obtained are set out in Table 4.

TABLE 4

| Ex (p) | Ti Comp Type | Ti Comp Amount (mM) (k) | TEA added (mM) (l) | EA added (mM) (q) | Yield of insoluble polymer (g/mM) (r) | Wt % Diluent soluble polymer (s) |
|---|---|---|---|---|---|---|
| 36 | 34 | 1.39 | 10 | NIL | 149.5 | 38.1 |
| 37 | 34 | 0.70 | 8 | 1.5 | 115.2 | 12.1 |
| 38 | 34 | 1.39 | 8 | 3 | 28.6 | 2.68 |
| 39 | 35 | 1:33 | 8 | 3 | 27.6 | 0.38 |
| 40 | 35 | 0.66 | 8 | 1.5 | 103.3 | 3.48 |
| 41* | 35 | 1.33 | 8 | 2.5 | 36.8 | 1.88 |

Notes to Table 4
(k) and (l) are as defined in Notes to Table 3.
(p) *The procedure was as described in the other Examples using propylene containing hydrogen. The initial concentration of hydrogen in the propylene was 0.036 volume % and during the polymerisation the pressure was maintained at one atmosphere by feeding propylene containing 0.095 % by volume of hydrogen.
(q) EA is ethyl anisate.
(r) Yield is expressed as grammes of insoluble polymer for each millimole of titanium present in the catalyst.
(s) Soluble polymer was determined as described in process details of Examples 36 to 41.

We claim:

1. A process for the production of a composition suitable for use as a component of an olefine polymerisation catalyst, which process comprises treating a component I which is at least one solid inorganic oxide with a component II which is a magnesium hydrocarbyl halide compound, a component III which is an ester and a component IV which is titanium tetrachloride, wherein (A) component I is reacted with component II;
(B) the product of stage (A) is reacted with either component III or component IV; and
(C) the product of stage (B) is reacted with whichever of component III or component IV is not used in stage (B) said component III being a carboxylic acid ester of the formula:

$$R^1COOR^2$$

in which
R¹ is a hydrocarbyl group which may be substituted with one or more halogen atoms and/or hydrocarbyloxy groups; and
R² is a hydrocarbyl group which may be substituted by one or more halogen atoms.

2. The process of claim 1 wherein, in stage (A), component I is reacted with component II, in stage (B), the product from stage (A) is reacted with component III, and in stage (C), the product of stage (B) is reacted with component IV.

3. The process of claim 1 wherein component I is silica, alumina, magnesia or mixtures of two or more thereof.

4. The process of claim 1 wherein component II is a compound of the formula $$MgR_{(2-x)}X_x$$

wherein
R is a hydrocarbyl group;
X is a halogen atom, other than fluorine; and
x is a number from 0.5 up to 1.5.

5. The process of claim 1 wherein the quantity of component II is in excess of one mole for each mole of reactive sites in the inorganic oxide.

6. The process of claim 1 wherein the ester which is component III is an ester of the formula $$R^1COOR^2$$

wherein

R¹ is an aryl group which may be substituted by one or more hydrocarbyloxy groups; and R² is an alkyl group.

7. The process of claim 1 wherein the ester which is component III is used in an amount of from 0.1 up to 0.8 mole for each mole of the reacted magnesium compound.

8. The process of claim 1 wherein the amount of titanium tetrachloride which is component IV is in a molar excess relative to the reacted magnesium compound.

9. The process of claim 1 wherein before or after stage (A), the at least one solid inorganic oxide which is component I, or the supported product from stage (A), is treated with at least one halogenating agent before it is treated with component III or component IV.

10. The process of claim 1 wherein the product of stage (A) is reacted simultaneously with at least one halogenating agent and the ester compound which is component III.

11. The process of claim 9 or claim 10 wherein the halogenating agent is a hydrogen halide, a silicon halide of the formula $$R_a^3SiX_{(4-a)},$$

a carboxylic acid halide of the formula $$R^4COX,$$

a hydrocarbyl halide of the formula $$R^5X_b,$$

phosphorus pentachloride, thionyl chloride, sulphuryl chloride, phosgene, nitrosyl chloride, a halide of a mineral acid, chlorine, bromine, a chlorinated polysiloxane, a hydrocarbyl aluminium halide, aluminium chloride or ammonium hexafluorosilicate, wherein R³ is hydrogen or a hydrocarbyl group;

R⁴ is a hydrocarbyl group;

R⁵ is a hydrocarbyl residue;

X is as hereinbefore defined;

a is 0 or an integer from 1 up to 3; and b is an integer from 1 up to 10.

12. The process of claim 9 or claim 10 wherein the quantity of the at least one halogenating agent is sufficient to provide at least one halogen atom at every reactive site on the at least one solid inorganic oxide which is component I.

13. The process of claim 1 or claim 9 wherein the product is separated and washed between each stage of the reaction.

14. An olefine polymerisation catalyst which comprises
(1) the reaction product obtained by the process of claim 1; and
(2) an organic compound of a metal of Group IIA of the Periodic Table or of aluminium or a complex of an organo-metallic compound of a metal of Group IA or Group IIA of the Periodic Table with an organic compound of aluminium.

15. The catalyst of claim 14 wherein component 2) is an aluminium trihydrocarbyl compound and the catalyst also includes an ester of the formula $$R^1COOR^2$$

wherein

R¹ is an aryl group which may be substituted by one or more hydrocarbyloxy groups; and R² is an alkyl group.

* * * * *